US009183744B2

(12) United States Patent
Smyth

(10) Patent No.: US 9,183,744 B2
(45) Date of Patent: Nov. 10, 2015

(54) METHOD FOR PROVIDING IMAGES OF TRAFFIC INCIDENTS

(75) Inventor: Brian J. Smyth, West Chester, PA (US)

(73) Assignee: HERE Global B.V., Veldhoven (NL)

( * ) Notice: Subject to any disclaimer, the term of this patent is extended or adjusted under 35 U.S.C. 154(b) by 1517 days.

(21) Appl. No.: 12/021,355

(22) Filed: Jan. 29, 2008

(65) Prior Publication Data

US 2009/0189979 A1 Jul. 30, 2009

(51) Int. Cl.

*H04N 7/18* (2006.01)
*G08G 1/04* (2006.01)
*G08G 1/0967* (2006.01)

(52) U.S. Cl.

CPC ............ *G08G 1/04* (2013.01); *G08G 1/096716* (2013.01); *G08G 1/096741* (2013.01); *G08G 1/096775* (2013.01)

(58) Field of Classification Search

CPC ..................... G02B 27/017; G02B 2027/0178; G02B 27/0093; G06F 3/013; G02C 7/00; G02C 5/008; B60R 25/1004; G01C 21/3492; H04N 7/181

USPC ............. 348/14.01, 22.1, 207, 168, 154, 148, 348/143, 149; 701/35, 533, 516, 117; 396/427; 345/8, 384.1, 374, 373, 36, 345/333.05, 333.01, 262, 240.99, 222.1, 345/211.99, 211.8; 709/204, 206, 248; 382/104, 107; 340/539.2, 903, 905

See application file for complete search history.

(56) References Cited

U.S. PATENT DOCUMENTS

| | | | | |
|---|---|---|---|---|
| 5,862,244 | A * | 1/1999 | Kleiner et al. | 382/104 |
| 5,982,298 | A | 11/1999 | Lappenbusch et al. | 340/905 |
| 6,411,328 | B1 * | 6/2002 | Franke et al. | 348/149 |
| 6,865,480 | B2 * | 3/2005 | Wong | 701/431 |
| 7,116,326 | B2 | 10/2006 | Soulchin et al. | 345/440 |
| 7,251,558 | B1 | 7/2007 | McGrath | 701/117 |
| 8,024,330 | B1 * | 9/2011 | Franco et al. | 707/724 |
| 2002/0141618 | A1 * | 10/2002 | Ciolli et al. | 382/104 |
| 2003/0204306 | A1 * | 10/2003 | Yamamoto et al. | 701/200 |
| 2004/0143385 | A1 | 7/2004 | Smyth et al. | 701/117 |
| 2006/0092043 | A1 * | 5/2006 | Lagassey | 340/907 |
| 2006/0095199 | A1 * | 5/2006 | Lagassey | 701/117 |
| 2008/0255754 | A1 * | 10/2008 | Pinto | 701/119 |
| 2009/0132673 | A1 * | 5/2009 | Sprigg | 709/207 |

* cited by examiner

*Primary Examiner* — David Lazaro
*Assistant Examiner* — Charles Murphy
(74) *Attorney, Agent, or Firm* — Lempia Summerfield Katz LLC

(57) ABSTRACT

A method for providing traffic incident information is disclosed. Selected images of a traffic incident are associated with corresponding traffic incident data. The combined information is provided to an end-user application, such as a navigation system, the Internet, and a television station. A user can obtain the combined traffic incident information from the end-user application and/or device to obtain a better understanding of the traffic incident.

17 Claims, 6 Drawing Sheets

Incident: Two-car accident

I-90 between Chesterbrook Boulevard and RT 30

Two lanes blocked

Emergency crews on site

METHOD FOR PROVIDING IMAGES OF TRAFFIC INCIDENTS

FIELD

The present invention relates generally to capturing images (still and/or video images) of traffic incidents, and more particularly, relates to associating specifically selected incident images with incident data and providing the combined traffic incident information to a user for a better understanding of a traffic incident.

BACKGROUND

Most drivers have been impacted by traffic delays. Traffic delays are caused by one or more traffic incidents, such as congestion, construction, an accident, a special event (e.g., concerts, sporting events, festivals), a weather condition (e.g., rain, snow, tornado), and so on. Regardless of the reason, drivers may become frustrated, which may result in bad driving (e.g., road rage) and stress-related health effects.

A driver is more likely to avoid a traffic incident or at least plan for the incident if the driver receives information regarding the incident prior to reaching the area impacted by the incident. A driver may obtain traffic information from numerous sources, such as television stations, the Internet, and in-vehicle or portable navigation systems. A traffic-information provider typically provides traffic information to these end-user applications.

The traffic-information provider obtains and compiles traffic data from one or more sources. For example, traffic data may be available from commercial traffic data providers, government departments of transportation, police and emergency services, road sensors, cameras, and airborne reports. The traffic-information provider then broadcasts compiled traffic data over a radio frequency to equipment designed to receive the broadcasts. For example, one system for broadcasting traffic and road condition information is the Radio Data System-Traffic Message Channel (RDS-TMC), which is used in some European countries. The traffic-information provider may also upload the data on one or more servers accessible via the Internet. Other distribution methods are also possible.

The end-user application (e.g., television, Internet, navigation system) typically provides a visual indicator on a map identifying a traffic incident. For example, the visual indicator may be an icon merged with the map. The icon may be customized for the type of incident. As another example, the visual indicator may be a color-coded traffic flow graphical representation that uses status colors (e.g., green, yellow, red) to reflect analysis of traffic flow data.

In addition to providing a visual indicator on a map, the end-user application may display images of a traffic incident from cameras located adjacent to a roadway. However, camera images can be difficult to interpret, especially if the driver does not know the direction and/or angle of the camera. As the cameras can often be moved in various ways, the driver cannot easily distinguish what roads are being presented. For example, some road-side cameras can cover a radius of over five miles.

Additionally, camera images may be overly distracting to a driver. Currently, there is no way for a driver to know whether there is something worthwhile in the image, so the driver is required to interpret the image while driving. As a driver views the camera image, the driver is not concentrating on current driving conditions and may cause another traffic incident.

Thus, it would be beneficial to provide images in a manner that allows a person to easily evaluate a traffic incident.

SUMMARY

A method for providing traffic incident information is disclosed. The method includes identifying a traffic incident, which may occur by viewing images from a plurality of cameras or receiving a communication identifying the traffic incident. The communication may be from surveillance aircraft or vehicles; scanners on police, fire, and emergency frequencies; or local department of transportations, traffic management centers, or other agencies.

The method also includes remotely manipulating a camera (changing direction and/or focus) to select an interpretive view of the traffic incident. The interpretive view is a view that a person can use to identify details regarding the traffic incident. The selected view is captured as at least one image, such as a still image or a video clip.

The method also includes collecting data regarding the traffic incident depicted in the image. The traffic incident data may be collected by entering the data into an electronic form. The entered data may be stored as a record in a database.

The captured image and the traffic incident data are associated. In one example, a file containing the image and the traffic incident data are stored in a record of a database. As another example, a reference to the file containing the image and the traffic incident data are stored in a record of a database. As yet another example, a file or a reference to the file containing the image is stored in a first record of a database and the traffic incident data is stored in a second record of the database, and the first and the second records have at least one field in common.

The image and the associated traffic incident data are provided, for example, to an end-user application. The end-user application may be a web application, a television station, a navigation system, and so on. The image and the associated traffic incident data may also be provided directly to an end-user device. Providing the image and the associated traffic incident data may also include displaying an icon that can be activated to display the at least one image. A user can obtain the combined image and traffic incident data from the end-user application and/or device to obtain a better understanding of the traffic incident.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
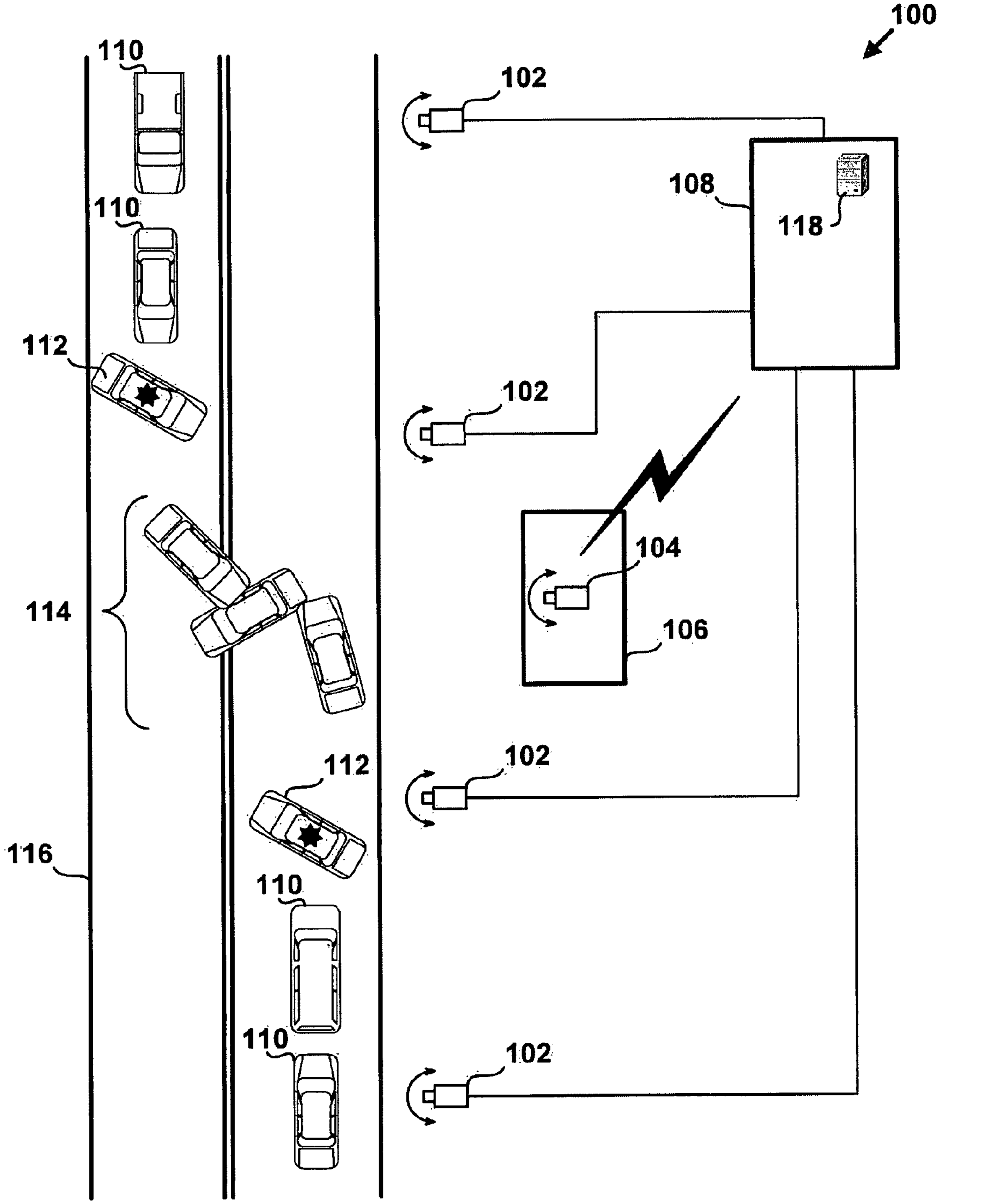
FIG. 1 is a pictorial representation of a traffic incident on a roadway, according to an example.

FIG. 1 is a pictorial representation 100 of a traffic incident 114 on a roadway 116. In this example, the traffic incident 114 is an accident involving three vehicles. However, a traffic incident may be any event that causes a traffic delay, such as congestion, road construction, a special event, foul weather conditions, and so on.

As a result of the incident 114, emergency vehicles 112 have stopped traffic in both directions. FIG. 1 depicts the emergency vehicles 112 as police cars; however, other emergency vehicles, such as fire trucks and ambulances, may also respond to the traffic incident 114. As a result of the traffic incident 114, vehicles 110 traveling in both directions along the roadway 116 have been stopped. The drivers of the vehicles close to the incident 114 may not be aided with traffic incident information (e.g., they are trapped in the stopped traffic and can see the incident 114). However, traffic information may be useful to other drivers.

For example, some drivers may be able to avoid the traffic incident 114 on the roadway 116 by choosing a different route. Other drivers may not be able to avoid the incident 114, but may benefit from knowing why the traffic has stopped. Additionally, people who have not started their trip may benefit. Potential drivers may avoid the roadway 116 until the traffic incident 114 clears. These potential drivers may learn of the traffic incident 114 and the status of the incident (e.g., when the traffic incident 114 clears) by obtaining information provided by a web application, television, or by other methods.

In addition to receiving an audible alert (e.g., radio, television, or navigation system announcement) and/or a visual indication (e.g., an icon or color-coded animation overlaying a map depicted on a television or navigation system screen), images (including video clips or other series of images) from cameras adjacent to the roadway 116 may be provided to a driver. For example, commercial traffic data providers, government departments of transportation, police and emergency services, and other entities may place cameras 102 adjacent to the roadway 116. As another example, these entities may place cameras 104 on buildings 106 adjacent to the roadway 116. As yet another example, individuals with cameras (including cameras on mobile telephones or other handheld devices) may also provide traffic incident images. The cameras 102, 104 may be remotely adjustable allowing a camera operator to change direction and focus (e.g., pan and zoom) the cameras.

Images, including still images and/or video clips, from the cameras 102, 104 may be routed to a server 118. Additional data may be routed to the server 118 with the images, such as a time stamp indicating when the image was taken and information regarding the location of the camera. The server 118 may be located at a facility remote from the cameras 102, 104. In this example, the server 118 is located in a building 108. However, the server 118 may be located at another facility, such as the building 106. The images from the cameras 102, 104 may be transmitted to the server 118 via a wired or wireless connection. Similarly, the images from individuals with cameras may be transmitted to the server 118, preferably using an Internet connection or a Multimedia Message Service (MMS) connection.

The server 118 is a computing platform that includes a combination of hardware, software, and/or firmware. For example, the server 118 may include a processor, memory, and a communication system. The communication system receives the images and other traffic incident data and transmits traffic incident information to end-user applications and/or devices.

Figure 2:
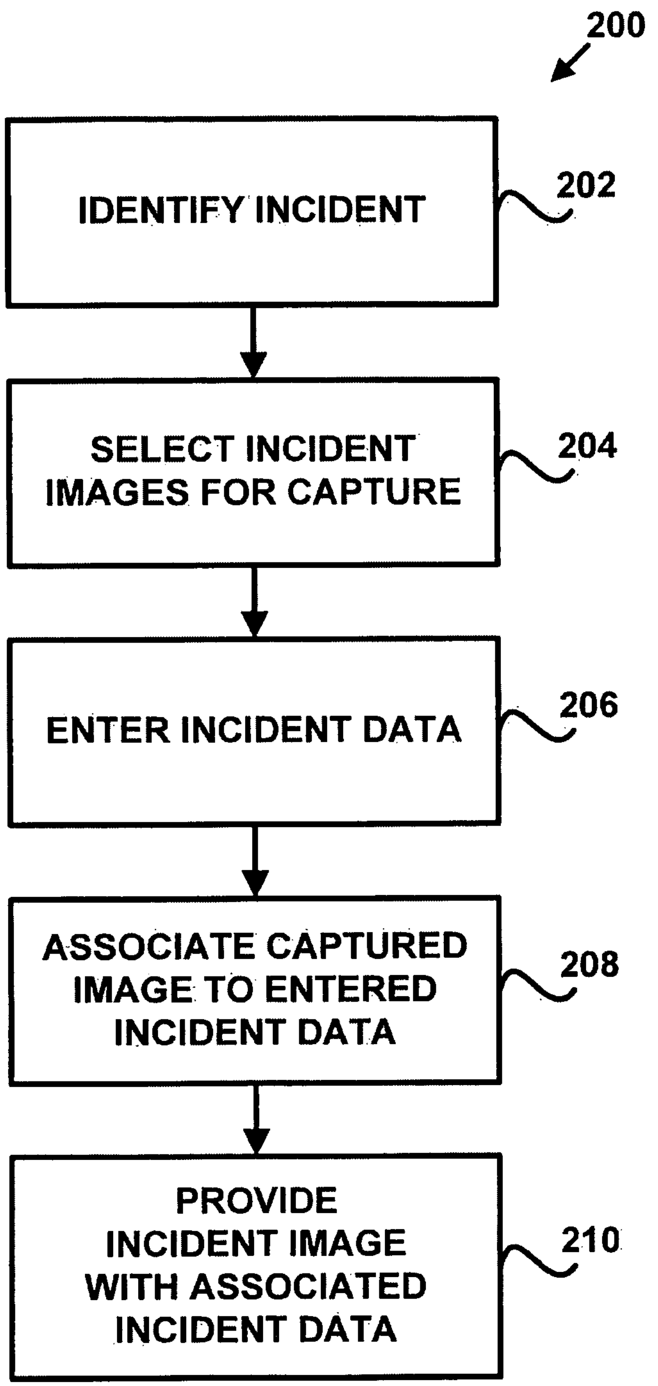
FIG. 2 is a flow diagram of a method for providing traffic incident images associated with traffic incident data, according to an example.

FIG. 2 is a flow diagram of a method 200 for providing traffic incident images associated with traffic incident data. It is understood that the traffic incident images may be still images and/or video images.

At block 202, a traffic incident is identified. In one example, a traffic operator views images from multiple cameras to identify a traffic incident. As the traffic operator scans the images, the traffic operator may notice a traffic incident, such as the incident 114. Additionally or alternatively, the traffic operator may be alerted to a traffic incident by communicating with surveillance aircraft or vehicles; listening to scanners on police, fire, and emergency frequencies; and communicating with local departments of transportation, traffic management centers, or other agencies. The traffic operator may also be alerted to traffic incidents via other means as well, such as receiving calls from individuals that have witnessed the incident.

At block 204, selected traffic incident images are captured. Once the traffic operator is alerted to an incident, the operator may view images of the incident from the cameras 102, 104 or received from an individual with a camera. For images obtained from the cameras 102, 104, the traffic operator selects the camera 102, 104 (or cameras) providing a clear view of the incident and manipulates (e.g., pans and zooms) the camera 102, 104 to obtain a view of the incident that a viewer can easily use to understand or interpret the incident. For example, some cameras may cover a radius of more than five miles so the traffic operator likely needs to move the direction that the camera 102, 104 is facing and/or change the focus of the camera 102, 104 to view the incident. Once the traffic operator has identified the most compelling image or images of the traffic incident, the operator captures one or more still images and/or a video clip. To capture an image or video clip, the operator may press or otherwise manipulate a "capture" button.

The captured image(s) or video clip may be stored as a file in a database associated with the server 118. For example, the database may be stored in memory located within the server 118 or otherwise accessible to the server 118. The memory may be any type of volatile or nonvolatile memory now known or developed in the future. The image file for a still image or a video clip may be stored in a bitmap, jpeg, mpeg, or any other conventional format (now known or developed in the future) as appropriate. Alternatively, a reference to the image file may be stored in the database and the server 118 uses the reference to obtain the stored image file.

At block 206, the traffic operator enters traffic incident data. The type of incident data collected depends on the type of incident. The incident data may include the type of incident (e.g., congestion, construction, accident, flooding), the number of vehicles involved in the incident, the presence of emergency or construction personnel on scene, what lanes are affected, and so on. For example, if the traffic operator is entering traffic data for an accident, the entered traffic data may include numerical values to indicate the number of cars involved, the number of lanes blocked, and the time the accident occurred. As another example, if the traffic operator is entering traffic data for congestion, the entered traffic information may include length of back-up and an estimate of the delay.

The traffic operator may enter incident data into a Traffic Information Management System (TIMS), such as the TIMS described in U.S. Patent Publication No. 2004/0143385, which is hereby incorporated by reference in its entirety. The traffic operator may enter traffic information using TIMS edit screens, which present the traffic operator with a menu to select the type of information entered for a particular type of incident. The TIMS uses a series of forms, or screens, to prompt the traffic operator for relevant information to be entered. The forms and fields used depend on the type of traffic information to be entered and what type of information the user has available. For example, the traffic information entered by the traffic operator may be accident, construction, weather, or other traffic incident information.

Figure 3:
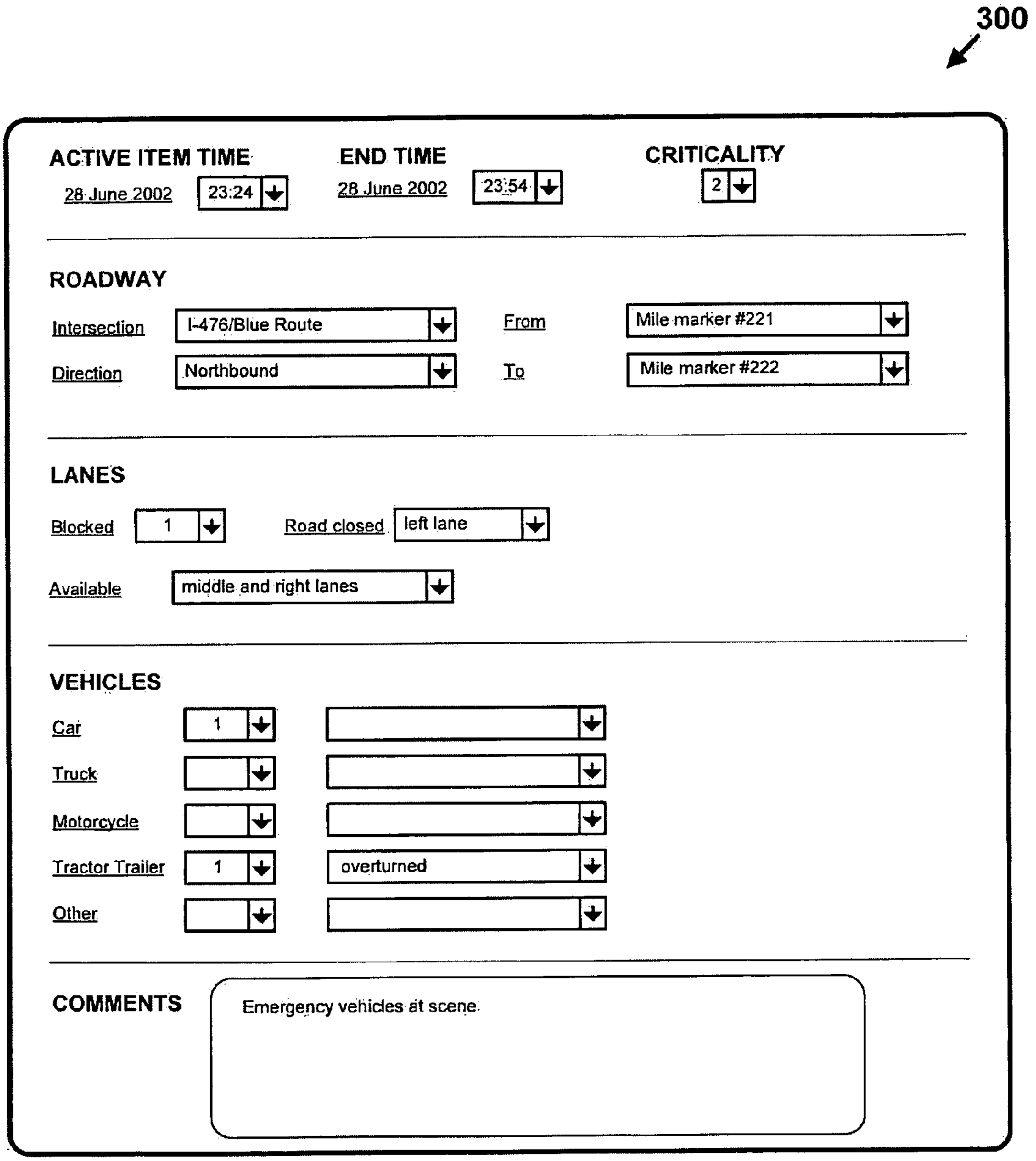
FIG. 3 is a form for collecting traffic incident data, according to an example.

FIG. 3 shows an example form 300 for collecting traffic incident data. The form 300 may be used to collect data regarding an accident. Other fields may be included in the form 300. Other forms may be used for collecting data regarding other traffic incident types. Alternatively, a single form may be used to collect traffic incident data for more than one incident type.

The entered traffic incident data may be stored as a record within the database accessible to the server 118. The traffic incident data record may be associated with the location of the incident 114 on the roadway 116. For example, the location of the incident may be defined by a single point or node having a known location on the roadway 116. As another example, the location of the incident may be defined by a pair of points having a known location straddling the incident (e.g., two mile markers located on opposite sides of the incident 114). Each of the points has a unique physical location (latitude, longitude, and optionally absolute or relative altitude) and each of the locations can be uniquely identified by its two dimensional (or three dimensional) geographic coordinates (i.e., latitude, longitude, and optionally altitude). Other methods may also be used to identify the location of the traffic incident.

Traffic flow data may also be collected in conjunction with the traffic incident data. The traffic flow data may be obtained from sensors located along the roadway 116. The sensors may collect traffic flow data, such as speed, volume (number of vehicles passing the sensor per period of time), vehicle classification (car or truck), and density (the percentage of the roadway that is occupied with vehicles). The traffic flow data may also be obtained from airplanes or other mobile units, traffic operators listening to scanners, or other means. The traffic flow data may be used to provide information regarding congestion.

At block 208, the image captured at block 204 and the incident data obtained at block 206 are associated. In one example, the image file (or the reference to the storage location of the image file) may be stored in the same database record as the traffic incident data. Alternatively, the image file (or the reference to the storage location of the image file) may be stored in a separate record having a common database field as the record used for storing the incident data. For example, the image record and the data record may include the same location data fields (e.g., latitude and longitude coordinates). Other database fields, such as a traffic incident record number or name, may also be used to associate the image record to the data record. As another example, the traffic operator may link the captured image to the entered data.

Figure 4:
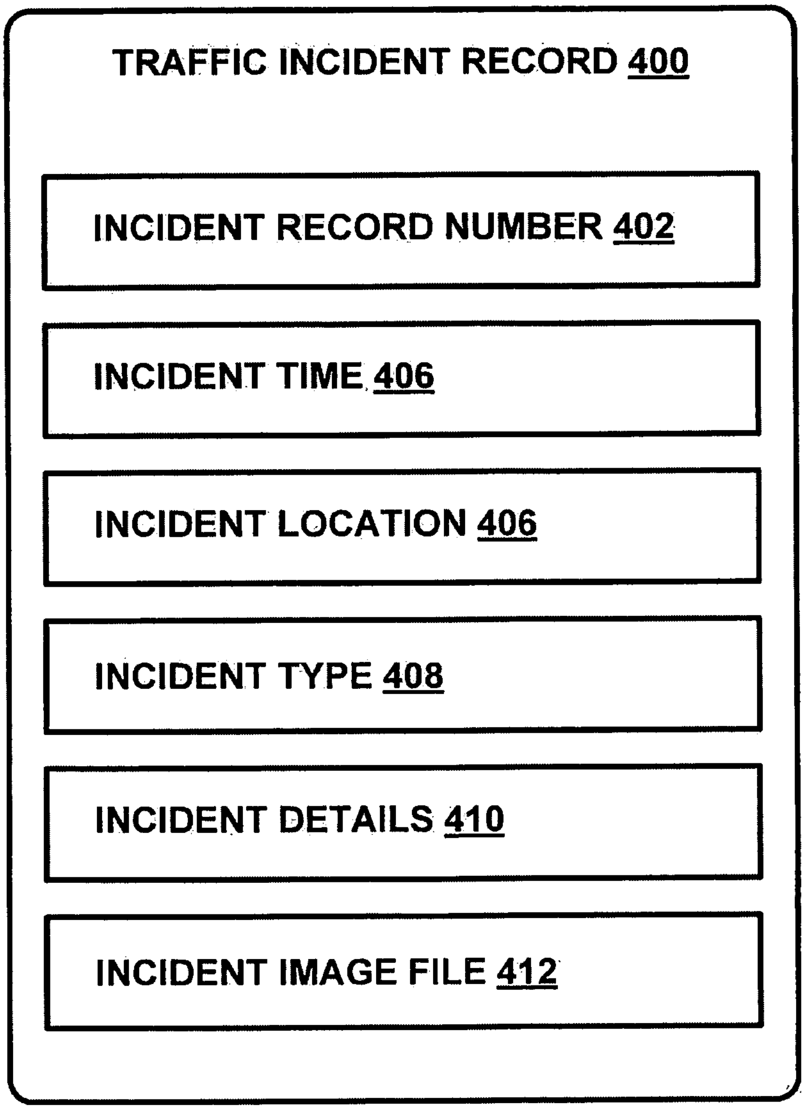
FIG. 4 is a traffic incident record for storing the traffic incident image and data in a database, according to an example.

FIG. 4 shows an example traffic incident record 400 for storing the traffic incident image file and data in a database. The traffic incident record 400 is a database entry stored in memory accessible to the server 118. In this example, the traffic incident record 400 includes fields for an incident record number 402, an incident time 404, an incident location 406, an incident type 408, incident details 410, and an incident image file 412. Other fields may also be available in the traffic incident record 400.

The incident record number field 402 includes a unique number or alphanumeric character string that identifies a single traffic incident or related traffic incidents (e.g., accident and resulting congestion). The incident record number 402 may be assigned by the traffic operator when entering traffic incident data. Alternatively, the incident record number 402 may be automatically generated by the server 118. For example, the incident record number may be a sequential numbering of incidents (e.g., record number 53 is the fifty-third incident).

The incident time field 404 includes data that identifies the time when the traffic incident was first identified or when the traffic incident record 400 was first opened. Additional incident time fields may be used to store data representing the duration of the traffic incident and/or the end of the traffic incident. For example, the duration of a traffic incident may be obtained from a traffic broadcast system that broadcasts traffic messages that include an expected duration, such as an ALERT-C message from the RDS-TMC system. The duration of the traffic incident may be obtained in other manners as well.

The incident location field 406 includes data that identifies the location of the traffic incident. For example, the incident location field 406 may include data representing a name assigned to the road segment where the traffic incident is located. Additionally or alternatively, geographical coordinates (e.g., latitude and longitude) may be stored in one or more location fields 406. The incident location field 406 or another record field may also include data regarding which part of the road segment (e.g., northbound) is impacted by the traffic incident. Further, the incident location field 406 or another record field may include data regarding the extent of the incident (e.g., one mile affected by the traffic incident).

The incident type field 408 includes data that identifies the type of incident, such as congestion, construction, accident, and weather. The incident details field 410 may contain different types of data depending on the incident type field 408. For example, if the incident type field 408 includes data representing an accident, one or more incident details fields 410 may include data regarding the number of vehicles involved in the incident, the presence of emergency personnel on scene, what lanes are affected, and so on.

The incident image file field 412 may include the captured image or video clip file. Alternatively, the image file field 412 may include a reference to the image file or video clip file. The server 118 may use the reference stored in the image file field 412 to retrieve the image file from storage.

Referring back to FIG. 2, at block 210, the captured images along with the entered incident data are provided to an end-user application and/or device that can be used by drivers and others interested in a traffic incident. The combined traffic incident images and data may be provided when requested from the end-user application, such as a web application, a television station, and a navigation system, or the end-user device, such as a personal computer, a mobile telephone, and a portable hand-held device.

The request for traffic incident information may include location information for an area of interest. The location information may include a street address, a city name, a route, or any other information that identifies the area of interest. The request for traffic incident information may also include a time of expected travel in the area of interest. Additionally, the request may include a position of the requester.

Figure 5:
FIG. 5 is a screen shot displaying combined traffic incident image and data, according to an example.

An example of a traffic incident image with associated incident data is shown in FIG. 5. Additionally or alternatively, the user may see a video icon displayed with the incident details. The user selects or otherwise activates the video icon and the selected image or video of the incident is displayed. Additional details regarding how the combined traffic incident images and data is provided to end-user applications is provided with reference to FIG. 6.

The traffic operator may continue to monitor the traffic incident until the incident has cleared. The method 200 may repeated for the traffic incident as the traffic operator sees changes or a more compelling view. The traffic operator may select a new image for capture and/or enter updated incident data depending on what changes have occurred. However, the traffic operator may not have to capture a new image or update the incident data depending on the status of the traffic incident. Additionally, the method 200 may be repeated for additional traffic incidents in both serial and parallel fashion, i.e., the cameras 102, 104 may capture images of multiple traffic incidents occurring at the same or a different time.

Figure 6:
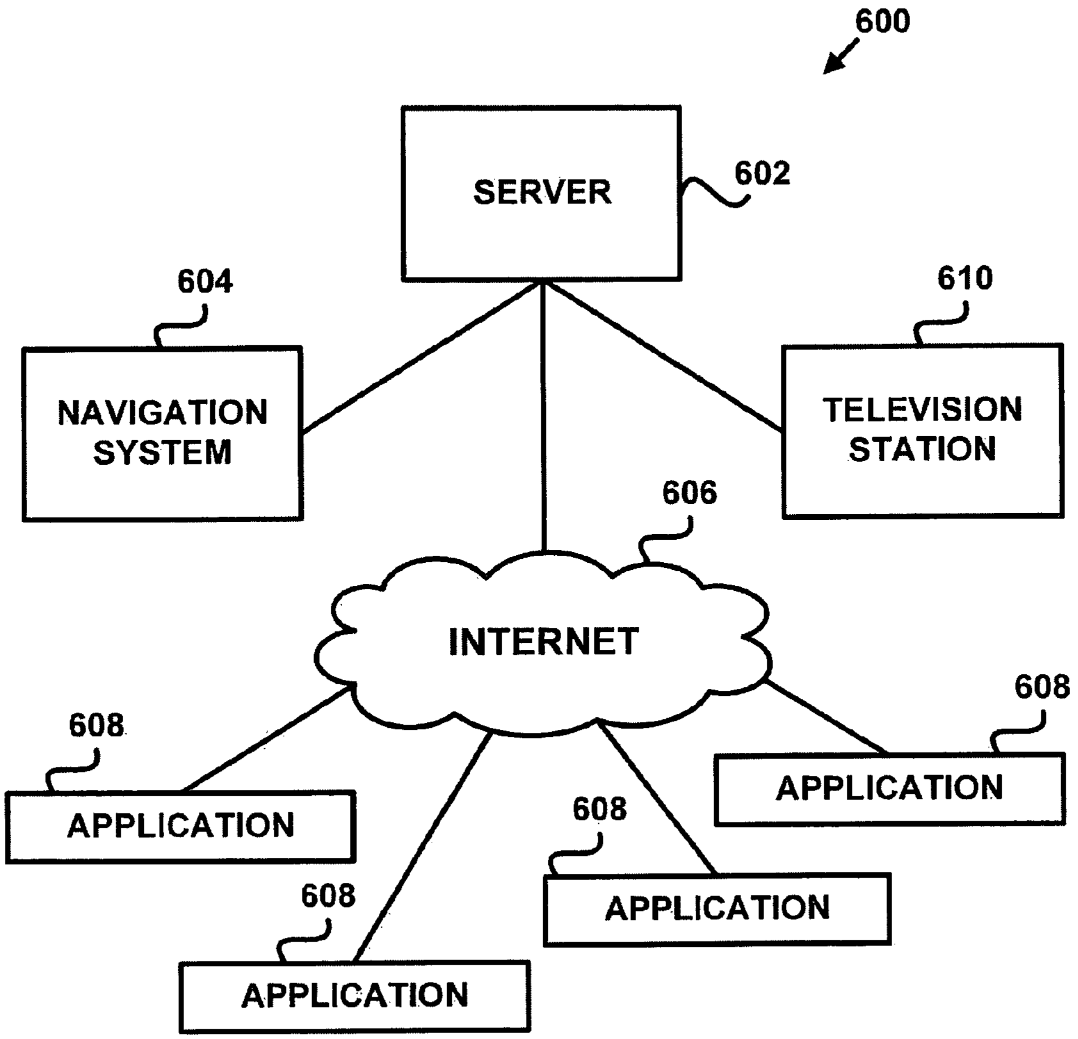
FIG. 6 is a block diagram showing a server providing traffic incident images with associated incident data to end-user applications, according to an example.

FIG. 6 is a block diagram 600 showing a server 602 providing traffic incident images with associated incident data to end-user applications. The server 602 is substantially the same as the server 118 depicted in FIG. 1. The server 602 may provide one or more files containing the traffic incident image and its associated incident data to end-user applications, such as a navigation system 604, the Internet 606, and/or a television station 610. The navigation system 604 may be an in-vehicle or portable navigation system. The server 602 may provide the combined traffic incident image/data file to other end-user applications as well. Additionally, the server 602 may provide the combined traffic incident image/data file directly to an end-user. For example, the end-user may have registered to receive a commute route and at a designated time and/or location, the file is sent to the end-user at a designated end-user device.

In one example, a software application 608 connected to the Internet 606 may automatically display camera views as part of a display on a webpage. Alternatively, the software application 608 may display a video icon on a webpage. A user may click or otherwise activate the icon, and the application 608 provides the combined traffic incident image/data file to the user's device. The user's device may be a personal computer, a mobile telephone, a portable hand-held device, or any other device that can communicate with the Internet 606.

As another example, the combined traffic incident image/data file may be sent to the television station 610 using, for example, Traffic.com's NeXgen platform. The file may then be integrated into a 2D or 3D callout box to be presented in a television news cast.

A series of traffic incident images may also be provided to end-user applications and devices. Each of the images may include a time-stamp that allows a user to see the progress of the traffic incident. A video stream may also be provided to the end-user applications and devices to provide the progression of the traffic incident to the user.

Because the traffic incident image has been selected to provide an interpretive view of the incident and the image is associated with traffic incident data, a user of this traffic incident information can easily determine the impact of the incident on the user. For example, the user may be able to avoid or plan for the traffic incident. Beneficially, the user (especially a driver) does not have to interpret camera images to determine whether a traffic incident has occurred and, if so, whether the incident will impact the user.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method of providing traffic incident information, comprising:

identifying a traffic incident at a first location from a plurality of cameras;

selecting a camera view of the traffic incident of a camera of the plurality of cameras by remotely manipulating the camera by changing at least one of direction and focus of the camera;

receiving at least one image of the camera view at a second location;

collecting textual information regarding the traffic incident depicted in the at least one image, wherein the textual information regarding the traffic incident is entered into an electronic form;

combining the at least one image with the traffic incident textual information;

receiving, from an end-user application, a request for traffic incident report comprising the combined at least one image and traffic incident textual information for the location of the traffic incident prior to the traffic incident clearing; and providing the combined at least one image and the traffic incident textual information to the end-user application at a third location, wherein the third location is different than the second location.

2. The method of claim 1 wherein identifying the traffic incident includes receiving a communication identifying the traffic incident.

3. The method of claim 1 wherein the at least one image is a video clip.

4. The method of claim 1 further comprising storing the at least one image as a file in a database.

5. The method of claim 1 further comprising storing the at least one image as a file and storing a reference to the stored file in a database.

6. The method of claim 1 further comprising storing data entered into the electronic form as a record in a database.

7. The method of claim 1 further comprising storing a file or a reference to the file containing the at least one image and the traffic incident textual information in a record of a database.

8. The method of claim 1 further comprising storing a file or a reference to the file containing the at least one image in a first record of a database and storing the traffic incident textual information in a second record of the database, wherein the first record and the second record have at least one field in common.

9. The method of claim 1 wherein the end user application is executed by an end-user device.

10. The method of claim 1, wherein providing the at least one image and the traffic incident textual information includes displaying an icon that can be activated to display the at least one image.

11. The method of claim 1, wherein the textual information describes whether an emergency crew is at the traffic incident.

12. A method of providing traffic incident information, comprising:

identifying a traffic incident from a plurality of cameras;

selecting a camera view of a traffic incident from of a camera of the plurality of cameras by remotely manipulating the camera by changing at least one of direction and focus of the camera;

storing an image file containing the selected camera view of the traffic incident;

collecting textual information corresponding to details of the traffic incident depicted in the image file;

storing the textual data corresponding to details of the traffic incident, wherein the details of the traffic incident are entered based on a display of the image file, and the details of the traffic incident include a location of the traffic incident and the type of incident;

receiving from a requester an end-user application for the image file and textual data corresponding to the details of the traffic incident, wherein the request includes a location of the end-user application; and based on the location of the requester in comparison to the location of the traffic incident, providing the image file and the textual data corresponding to the details of the traffic incident including the location of the traffic incident and the type of incident to the end-user application.

13. The method of claim 12 wherein storing the image file and storing the data includes storing the image file and the textual data corresponding to the details of the traffic incident in a record of a database.

14. The method of claim 12 wherein storing the image file and storing the data includes storing a reference to the image file and the textual data corresponding to the details of the traffic incident in a record of a database.

15. The method of claim 12 further comprising associating the image file with the traffic incident data by storing the image file or a reference to the image file in a first record of a database and storing the traffic incident data in a second record of the database, wherein the first record and the second record have at least one field in common.

16. A method of providing traffic incident information, comprising:

identifying a traffic incident from a plurality of cameras;

selecting a camera from the plurality of cameras;

remotely manipulating a camera by changing at least one of direction and focus of the camera to select a view of a traffic incident;

creating an image file that includes the selected view of the traffic incident;

displaying the selected view to a first user at a first location;

receiving textual data from the first user based on the displayed view of the traffic incident, wherein the textual data is entered into electronic form, wherein the textual data describes whether the traffic incident is congestion, construction, or flooding; and providing a report including the image file and the textual data in a response to a an end-user application for traffic incident information from a second user at a second location, wherein the request for traffic incident information includes location information associated with a location of the traffic incident.

17. The method of claim 16 further comprising storing the image file and the textual data in a database.

* * * * *